United States Patent
Sheffi et al.

(10) Patent No.: US 9,628,193 B2
(45) Date of Patent: Apr. 18, 2017

(54) HARDWARE EFFICIENT IMPLEMENTATION OF DECISION FEEDBACK PHASE ESTIMATION FOR AN ULTRA HIGH SPEED COHERENT RECEIVER

(71) Applicant: Multiphy Ltd., Ness Ziona (IL)

(72) Inventors: Nir Sheffi, Rehovot (IL); Gilad Katz, Sdema (IL); Albert Gorshtein, Ashdod (IL); Ehud Barzilai, Kiryat Ono (IL); Dan Sadot, Kfar Bilu (IL)

(73) Assignee: Multiphy Ltd., Ness Ziona (IL)

( * ) Notice: Subject to any disclaimer, the term of this patent is extended or adjusted under 35 U.S.C. 154(b) by 603 days.

(21) Appl. No.: 14/101,872

(22) Filed: Dec. 10, 2013

(65) Prior Publication Data
US 2016/0226577 A1 Aug. 4, 2016

Related U.S. Application Data

(60) Provisional application No. 61/735,605, filed on Dec. 11, 2012.

(51) Int. Cl.
*H04B 10/61* (2013.01)

(52) U.S. Cl.
CPC ................ *H04B 10/6165* (2013.01)

(58) Field of Classification Search
CPC .......... G01R 31/08; H03D 1/06; H04B 10/00; H04B 10/06; H04B 10/0795; H04B 10/18; H04B 10/50; H04B 10/14; H04B 10/67; H04B 10/079; H04J 14/06; H04L 1/00; H04L 7/00; H04L 7/02; H04L 25/02;

(Continued)

(56) References Cited

U.S. PATENT DOCUMENTS

| 6,249,180 B1* | 6/2001 | Maalej | H04L 1/0057 |
| | | | 329/304 |
| 7,580,482 B2* | 8/2009 | Endres | H04L 7/0278 |
| | | | 375/326 |

(Continued)

OTHER PUBLICATIONS

Y. Mori, "Unrepeated 200-km Transmission of 40-Gbit/s 16-QAM Signals using Digital Coherent Optical Receiver", 2009.*

(Continued)

*Primary Examiner* — Shawkat M Ali
(74) *Attorney, Agent, or Firm* — Alston & Bird LLP

(57) ABSTRACT

A method for estimating the phase of a modulated complex optical signal, according to which, the phase of the signal is isolated and the complex amplitude of the signal is digitized by a block of P samples. An adaptive filter minimizes phase-error between the phase of the received symbol and the phase of a sample, rotated by a phase correction factor, by iteratively performing a Block-Wise Phase LMS estimation on the samples using a step size parameter. During each iteration, the resulting correction factor consists of the sum of the estimated errors multiplied by this parameter, and the correction factor of previous iteration, which is updated, until obtaining the final correction factor from the last iteration. The samples constituting the received signal are recovered by adding the most updated correction factor to the phase of each sample and performing a decision regarding the phase of each sample.

9 Claims, 2 Drawing Sheets

(58) Field of Classification Search
CPC ......... H04L 25/03; H04L 27/06; H04L 27/08; H04L 27/38; H04W 24/02
USPC ............... 375/233, 261, 316, 340, 345, 346; 398/25, 65, 152, 159, 184, 186, 202, 205, 398/208; 714/776
See application file for complete search history.

(56) References Cited

U.S. PATENT DOCUMENTS

| | | | | |
|---|---|---|---|---|
| 7,606,498 B1* | 10/2009 | Wu | ........................ | H04B 10/60 398/152 |
| 8,767,575 B2* | 7/2014 | Zhang | .................. | H04B 10/611 370/252 |
| 9,094,122 B2* | 7/2015 | Roberts | ................ | H04B 10/677 |
| 2011/0033184 A1* | 2/2011 | Zhang | .................. | H04J 14/002 398/65 |
| 2011/0150503 A1* | 6/2011 | Winzer | .................. | H04B 10/60 398/202 |
| 2012/0106983 A1* | 5/2012 | Xu | ........................ | H04L 27/223 398/208 |
| 2012/0224847 A1* | 9/2012 | Ibragimov | ............ | H04L 27/223 398/16 |
| 2014/0219666 A1* | 8/2014 | Tselniker | .......... | H04L 25/03019 398/208 |

OTHER PUBLICATIONS

E. Ip, "Digital Equalization of Chromatic Dispersion and Polarization Mode Dispersion", 2007.*

D-S. Ly-Gagnon, "Coherent Detection of Optical Quadrature Phase-Shift Keying Signals With Carrier Phase Estimation", 2006.*

Proakis, J., *Digital Communications*, 4th ed. New York: McGraw-Hill, 2000, relevant pp. 639-641.

Tarighat, A. et al., *Least Mean-Phase Adaptive Filters With Application to Communications Systems*, IEEE Signal Processing Lett., vol. 11, No. 2, (Feb. 2004) 220-223.

Taylor, Michael, *Phase Estimation Methods for Optical Coherent Detection Using Digital Signal Processing*, J. Lightw. Technol., vol. 27, No. 7 (Apr. 2009) 901-914.

* cited by examiner

HARDWARE EFFICIENT IMPLEMENTATION OF DECISION FEEDBACK PHASE ESTIMATION FOR AN ULTRA HIGH SPEED COHERENT RECEIVER

FIELD OF THE INVENTION

The present invention relates to the field of optical communication systems. More particularly, the invention relates to a method and system for receiving and processing optical communication signals.

BACKGROUND OF THE INVENTION

Coherent detection of optical signals is once again of interest for applications in fiber optic communications, due to increasing demand for higher throughput, optical communication systems use advanced modulation formats which require increasing spectral efficiency of the system, such as differential QPSK (DQPSK), in which information bits are coded as phase transient between adjacent symbols. However, the signal is more and more sensitive to link impairment, such as dispersion and Polarization Mode Dispersion (PMD), which introduces amplitude and phase distortion to the optical signal. Therefore, efficient recovery should include not only signal amplitude, but also phase of the received optical signal.

In the coherent detection technique, an important aspect is Carrier Phase Recovery (CPR) or estimation (which can be made at the transmitter or at the receiver) which recovers and compensates for phase noise in the received optical signal (which originates from phase noise of the transmitting laser source or of the local oscillator of the receiver), thus enabling recovery of the information data.

Conventional methods for demodulating phase-shift keying (PSK) signals, which are based on digital carrier-phase estimation, are described for example, in "Digital Equalization of Chromatic Dispersion and Polarization Mode Dispersion," J. M. Kahn, Journal of Lightwave Technology, vol. 25, No. 8, pp. 2033-2043, August 2007, as well as in "Phase Estimation Methods for Optical Coherent Detection Using Digital Signal Processing," M. G. Taylor Journal of Lightwave Technology, vol. 27, no. 7, pp. 901-914, April 2009.

Carrier-phase estimation can restore the in-phase and quadrature components of the complex amplitude of the electric field the optical signal. However, the obtained complex amplitude includes phase-noise, which stems from semiconductor lasers used for the transmitter and local oscillator, which decreases the performance of the receiver.

"Coherent detection of optical quadrature phase-shift keying signals with carrier phase estimation," Gagnon et al, Journal of Lightwave Technology, vol. 24, no. 1, pp. 12-21, January 2006 discloses a conventional Mth power scheme to raise the received MPSK signals to the Mth power to estimate the phase reference in conjunction with a coherent optical receiver. By raising the received MPSK signals (which are complex signals) to the Mth power, the data carried by the complex signal is isolated from the phase of the signal and therefore, it is easier to estimate the phase. However, this scheme requires nonlinear operations, such as Mth power and arctan(·) which introduces a large latency to the detection system.

"Unrepeated 200-km transmission of 40-Gbit/s 16-QAM signals using digital coherent receiver," to Y. Mori et al (Opt. Exp., vol. 17, no. 3, pp. 1435-1441, February 2009) discloses another carrier-phase estimation method, which is based on the decision-feedback loop and the Least Mean Square (LMS) algorithm of the complex field amplitude. However, this method requires complex multiplication and sample-wise adaptation of the tap coefficient.

It is therefore an object of the present invention to provide a method for efficiently estimating the phase of a modulated optical signal, while reducing the Additive White Gaussian Noise.

It is another object of the present invention to provide a method for efficiently estimating the phase of a modulated optical signal, while reducing the complexity of the required hardware.

Other objects and advantages of the invention will become apparent as the description proceeds.

SUMMARY OF THE INVENTION

The present invention is directed to a method for estimating the phase of a modulated complex carrier signal (e.g., using M-PSK or M-QAM) transmitted by a laser source to a coherent receiver, via an optical channel. Accordingly, the phase of the signal is isolated, in the phase plane of the complex signal and a block of P samples is determined for digitizing the complex amplitude of the signal, according to the rate of phase variations of the channel and the amount of noise in the channel. A digitized phase-error is determined, which represents the difference between the phase of the digitized decoded symbol received by the receiver and the phase of a sample being the digitized complex amplitude detected by the coherent receiver, rotated by a phase correction factor on the complex plane. An adaptive filter is constructed to minimize the phase-error, by iteratively performing a Block-Wise Phase LMS estimation on the P samples according to a step size parameter, which is determined by a desired convergence rate. During each iteration, the resulting correction factor consists of the sum of the estimated errors of the P samples in the current iteration multiplied by the step size parameter, and the correction factor of previous iteration. Then the correction factor is updated during each iteration, until obtaining the final correction factor from the last iteration. The samples constituting the received signal are recovered by adding the most updated correction factor to the phase of each sample removing $2\pi$ cycles from the resulting phase and performing a decision regarding the phase of each sample. The most updated correction factor from the last iteration may be used as the initial value for estimating the phase error of the samples in the next block.

A Block-Wise Phase LMS estimation during each single iteration may be performed by:
  a) processing the samples of the signal, each sample in a block of P samples in parallel by a processing unit, by:
    a.1) rotating the phase of a current sample by adding a correction factor from the previous iteration to the phase;
    a.2) removing $2\pi$ cycles from the resulting phase;
    a.3) producing the decoded symbol by a DD;
    a.4) calculating the estimation error by subtracting the correction factor from the decoded symbol;
  b) summing all P errors obtained from all processing units averaging the sum, and using the step size parameter, to obtain an error gradient value of current iteration; and
  c) calculating the correction factor for the next iteration by adding the correction factor from the previous iteration to the error gradient value of the current iteration and removing $2\pi$ cycles from the resulting phase.

The error gradient of the current iteration value may be calculated by a multiplier or by shifting bits, if whenever $\mu/P=2^n$. Whenever the transmitting laser source transmits an optical signal with X and Y polarizations, the Block-Wise Phase LMS estimation is superimposed for both X and Y polarizations, by using a block of 2P samples, consisting of P samples for X polarization and P samples for Y polarization.

The accuracy of the correction factor is iteratively increased by:
a) performing a first estimation process on each sample of a block, using an initial correction factor from the previous block;
b) performing a second estimation process using an initial correction factor resulting from the first estimation process;
c) repeating the previous steps until obtaining the final correction factor; and
d) inputting the final correction factor to all processing units to produce the set of recovered samples, which constitute the received signal.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
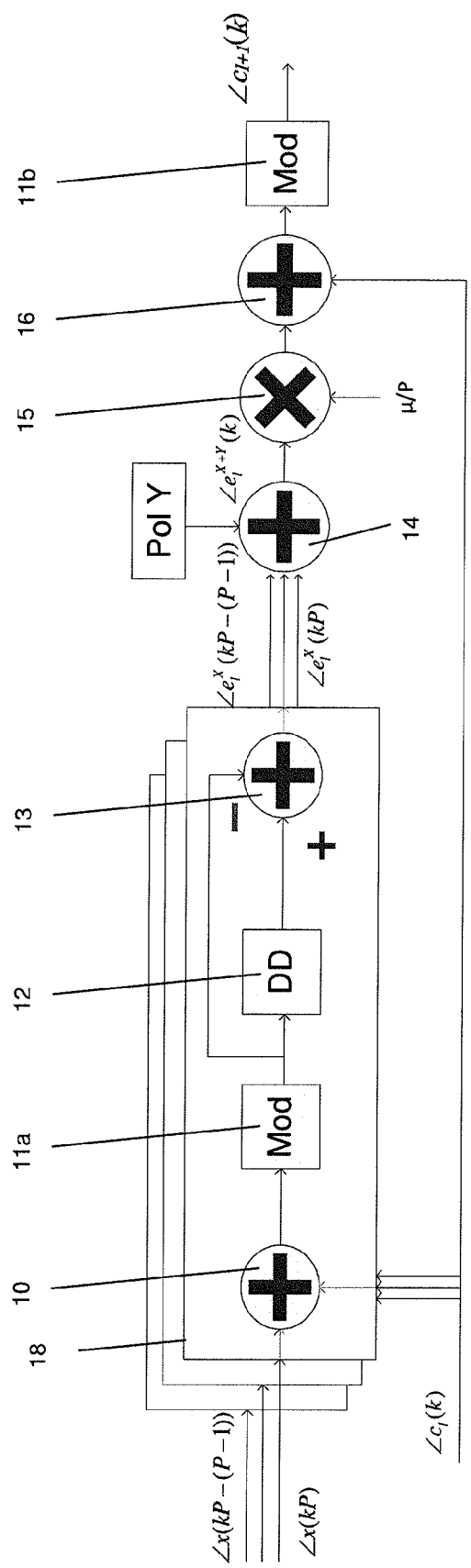
FIG. 1 is a Block diagram of single iteration block-wise joint polarization phase LMS for polarization X, according to a preferred embodiment of the invention.

The present invention discloses a novel decision feedback carrier phase estimation technique which is done in the phase plane of the complex signal. By doing so, the operation of raising the entire received complex signals to the Mth power is eliminated, such that the process of estimating and correcting the phase is done using addition and subtraction operations, which are much simpler to realize. This technique is performed block-wise, allows MPSK and MQAM with the use of adders instead of complex multiplication in the phase domain.

Decision Feedback Phase LMS

A phase-error cost function is defined as:

$$J_{pe}(\angle c(n)) = E|\angle d(n) - \angle(c(n) \cdot x(n))|^2 \quad \text{(Eq. 1)}$$

Where E is the expectation, x(n) is the n-th digitized complex amplitude detected by the coherent receiver (i.e., the sample), c(n) is the tap coefficient (tap coefficients are an array of constants by which of a FIR filter multiplies an array of the most recent n data samples, and sums the elements of the resulting array), which rotates x(n) on the complex plane and d(n) is the decoded symbol. The notation $\angle$ stands for the phase of each complex number. The goal is to construct an adaptive filter to minimize $J_{pe}(\angle c(n))$ (i.e., to minimize the mean square error between the received data and the product of multiplying the received signal by the estimated phase, so as to obtain estimation which compensates for the phase shifts (i.e., rotating x(n) on the complex plane to reconstruct the decoded symbol d(n)). Estimation should be adaptive, since the phase vary with time due to shifts in the properties of the optical channel and the transmitting laser.

Sample-Wise Phase LMS

Due to the fact that c(n) only rotates the signal x(n) on the complex plane, the update equation for a steepest-descent implementation is given by:

$$\angle c_{l+1}(n) = \angle c_l(n) - \mu \frac{1}{2} \frac{d J_{pe}(\angle c_l(n))}{d(\angle c_l(n))} \quad \text{(Eq. 2)}$$

Where $\mu$ is the step size parameter, which determines the stability and convergence speed of the algorithm and $\angle c_l(n)$ represents the tap coefficient at the l-th iteration.

The gradient of $J_{pe}(\angle c(n))$ is given by:

$$\frac{1}{2} \frac{d J_{pe}(\angle c_l(n))}{d(\angle c_l(n))} = -E(\angle d_l(n) - (\angle c_l(n) + \angle x(n))) \quad \text{(Eq. 3)}$$

Where $\angle d_l(n)$ represents the decoded symbol at the l-th iteration. Thus, the sample wise phase LMS is given by:

$$\angle c_{l+1}(n) = \angle c_l(n) + \mu E \angle e_l(n) \quad \text{(Eq. 4)}$$

$$E \angle e_l(n) = E(\angle d_l(n) - (\angle c_l(n) + \angle x(n))) \quad \text{(Eq. 5)}$$

Where $\angle e_l(n)$ represents the estimation error defined as the phase difference between the rotated complex amplitude and the desired symbol at the l-th iteration.

Block-Wise Phase LMS

The laser phase noise is static over a large observation window compared to the symbol period which in the case of 100 Gb/s QPSK system is about 36 pSec. Thus, it is worth to estimate the carrier phase of a whole block of samples rather than the phase of a single sample. In order to reduce the noise in the estimate of the gradient, it is suggested to perform an averaging operation and update the equalizer tap coefficient every P samples, where P is the block size. In this case, the obtained estimation will be more accurate than the estimation obtained while using Sample-Wise Phase LMS, and therefore, Block-Wise Phase LMS will allow working in more noisy environments.

In the case of carrier phase estimation there is a tradeoff between the laser linewidth (the spectral linewidth of a laser beam) and the amount of Additive White Gaussian Noise (AWGN) in choosing the optimal P. Generally, there is a tradeoff between the variation rate of the optical channel and the laser phase and the block size P—a higher the variation rate leads to a smaller P, which is more noise-sensitive. Therefore, if the transmitting laser source is stable (and has low phase noise), it is possible to get accurate estimations even in a noisy optical channel. Also, if the noise of the optical channel is low (a stable channel), it is possible to get accurate estimations even with a transmitting laser source that has higher phase noise.

Due to the slowly varying Brownian behavior of the laser phase, estimation in the previous block is used as the initial value of the next block.

Thus, Eq. 4 and Eq. 5 may be rewritten as:

$$\angle c_0(k+1) = \angle C_L(k) \quad \text{(Eq. 6)}$$

$$\angle c_{l+1}(k) = \angle c_l(k) + \frac{\mu}{P} \sum_{p=0}^{P-1} \angle e_l(kP - p) \quad \text{(Eq. 7)}$$

$$\angle e_l(kP-p) = \angle d_l(kP-p) - (\angle c_l(k) + \angle x(kP-p)) \quad p = 0, \ldots, P-1 \quad \text{(Eq. 8)}$$

Where $\angle c_l(k)$ is the rotation phase of the k-th block at the l-th iteration. The other symbol definitions remain sample-wise.

FIG. 1 is a block diagram of single iteration block-wise joint polarization phase LMS (Pol. X), according to a preferred embodiment of the invention. In this iteration l, the received signal is sampled and a block k of P samples ∠x(kP), ..., ∠x[kP−(P−1)] is processed (all P samples in parallel), where each sample is processed by a processing unit 18 (a rectangle in FIG. 1) containing an adder 10, a Modulus 11, a Decision Device (DD) 12 and a subtractor 13 (there are P processing units 18, one for processing each sample). Adder 10 receives a sample ∠x(kP−p) and adds the correction factor ∠$C_l$k from the previous iteration to that sample, which rotates its phase. Modulus 11a removes $2\pi$ cycles from the resulting phase and the result is input into DD 12 which produces the decoded symbol ∠$d_l$k. Then subtractor 13 subtracts the correction factor from the decoded symbol ∠$d_l$k, to obtain the error ∠$e_l$(kP−p), as indicated in Eq. 8. The set of errors ∠$e_l$(kP), ..., ∠$e_l$k[P−(P−1)] obtained from all processing units 18 are summed by adder 14 to produce the sum ∠$e_l$(k) of all P errors from all samples. Multiplier 15 outputs the error gradient of the current iteration value $$\frac{\mu}{P} \sum_{p=0}^{P-1} \angle e_l(kP - p),$$

where $\mu$ is the step size that is determined by a desired convergence rate.

Alternatively, the decoded symbol may be produced by using a training sequence that is transmitted over the optical channel. Using a training sequence allows even better estimation of the phase variations of the optical channel, since in this case, the modulated signal (the training sequence) is known.

Then adder 16 adds the correction factor ∠$c_l$(k) (i.e., the estimation) also to the error gradient of the current iteration value and modulus 11b removes $2\pi$ cycles from the resulting phase, to obtain the correction factor ∠$c_{l+1}$(k) for the next iteration l+1 of block k.

It should be noted that if $\mu$ and P are selected to be a power of 2 (i.e., the factor ($\mu$/P)=$2^n$), the multiplication operation of Multiplier 15 can be replaced by just shifting bits.

Block-Wise Joint Polarization Phase LMS

The laser phase noise of the transmitter and local oscillator of the receiver resides in both X and Y polarization, thus the phase information can be superimposed. Since phase noise is originated from the same source (i.e., the same laser source is used for both polarizations), the number of samples that can be used for phase estimation during a given time period is doubled and therefore, averaging over a doubled block size is more accurate. This way, using Block-Wise Joint Polarization Phase LMS allows accurate estimations even if the laser source is noisy.

Looking again at FIG. 1, if both X and Y polarization are used, the same processing described above is implemented by the processing unit 18 both for X and Y polarizations. In this case, the set of errors ∠$e^X_l$(kP), ..., ∠$e^X_l$k[P−(P−1)] for X polarization obtained from all processing units 18 are summed by adder 14, along with the set of errors ∠$e^Y_l$(kP), ..., ∠$e^Y_l$k[P−(P−1)] for Y polarization (Pol Y) to produce the sum ∠$e^{x+y}_l$(k) of all P errors from all samples of both polarizations.

The solution proposed by the present invention if hardware efficient, since if the phase change within a time window is relatively small (which is the case for high speed communication with common lasers), the same phase estimator can be used for the entire block of P samples. The defined cost function, which is a minimum mean square error of the phase of the complex numbers, is shown to be equivalent to a uni-dimensional problem in the phase domain thus the least mean square method is applied there with only adders instead of multipliers with lower number of components.

FIG. 1 is a Block diagram of an L iteration block-wise joint polarization phase LMS (Polarization X), according to a preferred embodiment of the invention. In this case, the same phase estimation process described in FIG. 1 for a single iteration is repeated for each iteration in the group of L iterations $Est_1$, ..., $Est_L$, to obtain a more accurate estimation for each sample. Accordingly, all samples ∠x(kP), ..., ∠x[kP−(P−1)] (of block k) first undergo a first estimation process $Est_1$ (similar to the process described in FIG. 1) using an initial correction factor ∠$c_0$(k) from the previous block k−1. The result of the first estimation process $Est_1$ is the first correction factor ∠$c_1$(k). Then all of these samples undergo a second estimation process $Est_2$ (similar to the process described in FIG. 1) to produce the second correction factor ∠$c_2$(k), using an initial correction factor ∠$c_1$(k), resulted from first estimation process $Est_1$ and so forth, while each time, the correction factor ∠c(k) becomes more accurate, until the last iteration $Est_L$ which ends by obtaining the best and final correction factor ∠$c_L$(k), which is input to a set of P processing units 18, along with all samples ∠x(kP), ..., ∠x[kP−(P−1)] of block k (each sample to a processing unit) to produce the set of recovered samples ∠$r^X$(kP), ..., ∠$r^X$k[P−(P−1)], which constitute the received signal. For example, if the phase shift of the channel is 6°, and the number of iterations is 5, it is possible to converge to the right estimation in steps, such that after the first iteration the estimation will be 1°, after the second iteration the estimation will be 3°, and so forth, until the last iteration in which the estimation will be 5°, which is the closest to 6°.

The best and final correction factor ∠$c_L$(k) for block k, is used as an initial correction factor ∠$c_0$(k+1) to start the iterations for the next block k+1.

Figure 2:
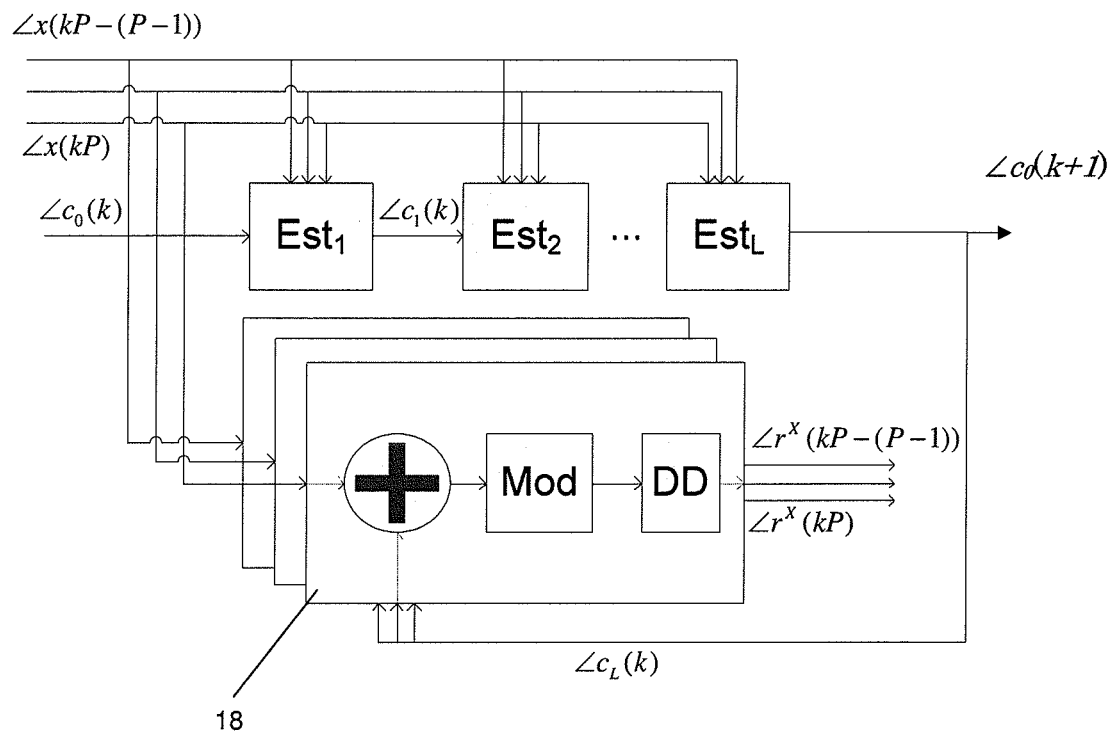
FIG. 2 is a Block diagram of an L iteration block-wise joint polarization phase LMS for polarization X, according to a preferred embodiment of the invention.

Although FIG. 2 illustrates the estimation process for Polarization X, the same estimation process can be repeated for Polarization Y.

The proposed phase estimation method is operable not just for M-PSK, but for all modulation formats (such as M-QAM, M-PSK etc.).

The above examples and description have of course been provided only for the purpose of illustration, and are not intended to limit the invention in any way. As will be appreciated by the skilled person, the invention can be carried out in a great variety of ways, employing more than one technique from those described above, other than used in the description, all without exceeding the scope of the invention.

REFERENCES

[1] E. Ip and J. M. Kahn, "Digital Equalization of Chromatic Dispersion and Polarization Mode Dispersion," J. Lightw. Technol., vol. 25, no. 8, pp. 2033-2043, August 2007.

[2] M. G. Taylor, "Phase Estimation Methods for Optical Coherent Detection Using Digital Signal Processing," J. Lightw. Technol., vol. 27, no. 7, pp. 901-914, April 2009.

[3] D.-S. Ly-Gagnon, S. Tsukamoto, K. Katoh, and K. Kikuchi, "Coherent detection of optical quadrature phase-shift keying signals with carrier phase estimation," J. Lightwave Technol., vol. 24, no. 1, pp. 12-21, January 2006.

[4] Y. Mori, C. Zhang, K. Igarashi, K. Katoh, and K. Kikuchi, "Unrepeated 200-km transmission of 40-Gbit/s 16-QAM signals using digital coherent receiver," Opt. Exp., vol. 17, no. 3, pp. 1435-1441, Febuary 2009.

[5] A. Tarighat and A. H. Sayed, "Least Mean-Phase Adaptive Filters With Application to Communications Systems," IEEE Signal Processing Lett., Vol. 11, No. 2, Febuary 2004.

[6] J. Proakis, Digital Communications, 4th ed. New York: McGraw-Hill, 2000.

The invention claimed is:

1. A method for estimating a phase of a modulated complex carrier signal transmitted by a laser source to a coherent receiver, via an optical channel, comprising:
   a) isolating the phase of said modulated complex carrier signal, in a phase plane of the modulated complex carrier signal;
   b) determining a block of P samples for digitizing a complex amplitude of said modulated complex carrier signal, according to a rate of phase variations of said optical channel and an amount of noise in said optical channel;
   c) determining a digitized phase-error being a difference between a phase of a digitized decoded symbol received by said coherent receiver and a phase of a sample being the digitized complex amplitude detected by said coherent receiver, rotated by a phase correction factor on a complex plane;
   d) constructing an adaptive filter to minimize said digitized phase-error, by:
      d.1) iteratively performing a Block-Wise Phase Least Mean Square (LMS) estimation on said P samples according to a step size parameter, determined by a desired convergence rate, while during each iteration, the resulting correction factor consists of a sum of estimated errors of the P samples in a current iteration multiplied by said step size parameter, and a correction factor of previous iteration;
      d.2) updating the resulting correction factor during each iteration until obtaining a final correction factor from a last iteration; and
      d.3) recovering the P samples constituting a received signal by adding the most updated correction factor to the phase of each sample removing $2\pi$ cycles from the resulting phase and performing a decision regarding the phase of each sample.

2. A method according to claim 1, wherein the Block-Wise Phase LMS estimation during each iteration is performed by:
   a) processing the P samples of the modulated complex carrier signal, each sample in a block of P samples in parallel by a processing unit, by:
      a.1) rotating a phase of a current sample by adding a correction factor from the previous iteration to said phase;
      a.2) removing $2\pi$ cycles from the resulting phase;
      a.3) producing the decoded symbol by a Decision Device (DD);
      a.4) calculating an estimation error by subtracting the correction factor from the decoded symbol,
   b) summing all P errors obtained from all processing units averaging the sum, and using the step size parameter, to obtain an error gradient value of current iteration; and
   c) calculating the correction factor for a next iteration by adding the correction factor from the previous iteration to said error gradient value of the current iteration and removing $2\pi$ cycles from the resulting phase.

3. A method according to claim 1, wherein an error gradient of the current iteration value is calculated by a multiplier.

4. A method according to claim 1, wherein whenever $\mu/P=2^n$, where $\mu$ is the step size parameter and n is an integer, an error gradient of a current iteration value is calculated by shifting bits.

5. A method according to claim 1, wherein whenever the transmitting laser source transmits an optical signal with X and Y polarizations the Block-Wise Phase LMS estimation is superimposed for both X and Y polarizations, by using a block of 2P samples, consisting of P samples for X polarization and P samples for Y polarization.

6. A method according to claim 1, wherein accuracy of the correction factor is iteratively increased by:
   a) performing a first estimation process on each sample of a block, using an initial correction factor from a previous block;
   b) performing a second estimation process using an initial correction factor resulting from said first estimation process;
   c) repeating the previous steps until obtaining the final correction factor; and
   d) inputting said final correction factor to all processing units to produce a set of recovered samples, which constitute the received signal.

7. A method according to claim 1, wherein the carrier signal is modulated according using M-ary Phase Shift Keying (M-PSK or M-ary Quadrature Amplitude Modulation (M-QAM).

8. A method according to claim 1, wherein the most updated correction factor from the last iteration is used as an initial value for estimating the phase error of the samples in a next block.

9. A method according to claim 2, wherein the decoded symbol is produced by using a training sequence that is transmitted over the optical channel.

* * * * *